United States Patent [19] [11] 3,927,873
Chambers [45] Dec. 23, 1975

[54] SELF-CENTERING CHUCK

[75] Inventor: Arnold Chambers, Chesterfield, England

[73] Assignee: Glass Tubes and Components Limited, Chesterfield, England

[22] Filed: July 22, 1974

[21] Appl. No.: 490,581

[30] Foreign Application Priority Data
Aug. 9, 1973 United Kingdom............... 37846/73

[52] U.S. Cl................ 269/154; 51/227 R; 269/224; 269/225; 269/237; 269/257; 279/1 L; 279/106
[51] Int. Cl.² ............................................ B25B 1/20
[58] Field of Search ........................... 269/152–155, 269/224, 225, 227, 237, 257; 279/1 L, 106, 117; 51/227 R

[56] References Cited
UNITED STATES PATENTS
| 240,022 | 4/1881 | Heisey et al. ................... 279/106 X |
| 606,736 | 7/1898 | Platt et al. ..................... 279/106 X |
| 887,103 | 5/1908 | Lane................................... 269/227 |
| 1,369,454 | 2/1921 | Mathy.............................. 51/227 R |
| 2,542,676 | 2/1951 | Hunter.............................. 269/154 |

Primary Examiner—Al Lawrence Smith
Assistant Examiner—Robert C. Watson
Attorney, Agent, or Firm—Robert F. O'Connell

[57] ABSTRACT

A self-centering chuck for holding glassware has two sets of jaws, the jaws of one set being resiliently biassed to hold a workpiece while allowing a positive drive acting on the other set of jaws to centre the workpiece. The resiliently biassed jaws are of arcuate form and are moved in arcuate guides by rack bars which are biassed by springs.

10 Claims, 5 Drawing Figures ically-operated chuck which is capable of positively holding delicate glasses of a variety of shapes, and of centralising them with respect to the axis of revolution of the chuck.

SELF-CENTERING CHUCK

The present invention relates to a self-centering chuck suitable, inter alia, for holding delicate, fragile workpieces such as glassware.

At certain stages in the manufacture of drinking glasses, such as tumblers and goblets, it is necessary to revolve them in a chuck whilst performing certain operations thereon. Operations involving chucking include removal of the moil, and rimming or smoothing the edge formed upon removal of the moil to produce the finished rim. The moil is the globule of excess glass which remains after blowing.

Heretofore, vacuum-operated chucks have been employed, especially by manufacturers whose products range over a wide variety of shapes. Such chucks are capable of holding glasses of widely differing shapes but their use has not been without problems. It is common for the bowl, stem and foot of stemware glasses to be out of square and to lack concentricity. It is extremely difficult to centre such glasses on vacuum-operated chucks with the accuracy required by the succeeding operations. Furthermore, with vacuum-operated chucks there is always the risk of accidental release.

An object of the present invention is to provide a mechanically-operated chuck which is capable of positively holding delicate glasses of a variety of shapes, and of centralising them with respect to the axis of revolution of the chuck.

According to the present invention, there is provided a chuck comprising a body, a foot attached to the body, a first set of movable jaws for holding a workpiece against the foot, a second set of movable jaws for centering the workpiece upon the chuck, said second set of jaws being further from the foot than the first set of jaws, means coupled to said first and second sets of jaws for moving the jaws inwardly and outwardly, and resilient biassing means urging the jaws of the first set resiliently towards the foot to enable the second set of jaws to shift the workpiece into a centred position while it is held by the first set of jaws.

For simplicity of handling, it is desirable that the jaws of each set are movable inwardly and outwardly simultaneously and at the same rate as the other jaws of the same set. Three or more jaws can form each set. Preferably the jaws and the foot are detachable from the chuck to enable substitutes to be fitted to facilitate the accommodation of workpieces of different shapes.

Means for moving the jaws of one or other set can include racks engaging teeth formed on the jaws. Such a construction is employed in a preferred embodiment for the first set of jaws. In this case, these holding jaws are of arcuate shape, and as their racks are moved in a holding direction, the jaws each swing in towards the foot following a curved path. Alternatively, the means for moving the jaws of one or other set can include simple push-rods mounted in the body, the push rods being coupled to pivotally mounted jaws in such manner that reciprocal movements of the push rods swing the jaws in and out. This construction is used in the preferred embodiment for moving the centering jaws.

The resilient biasing means acting on the first jaws can be springs which may act directly upon the individual jaws. Alternatively, the biasing springs could act upon the means for moving the jaws. Such construction is adopted in a preferred embodiment. In this embodiment, the positions of a pair of relatively movable members control the settings of the two sets of jaws, and the biasing springs are located between the two control members such that once the position of the control member controlling the centering jaws is fixed, the biasing springs are able to urge the other control member and the holding jaws towards a closed position thereof.

Preferably, the foot is attached to the body through a universal joint which facilitates the centering action of the centering jaws. An embodiment of the present invention will now be described by way of example with reference to the accompanying drawings, in which.

Figure 1:
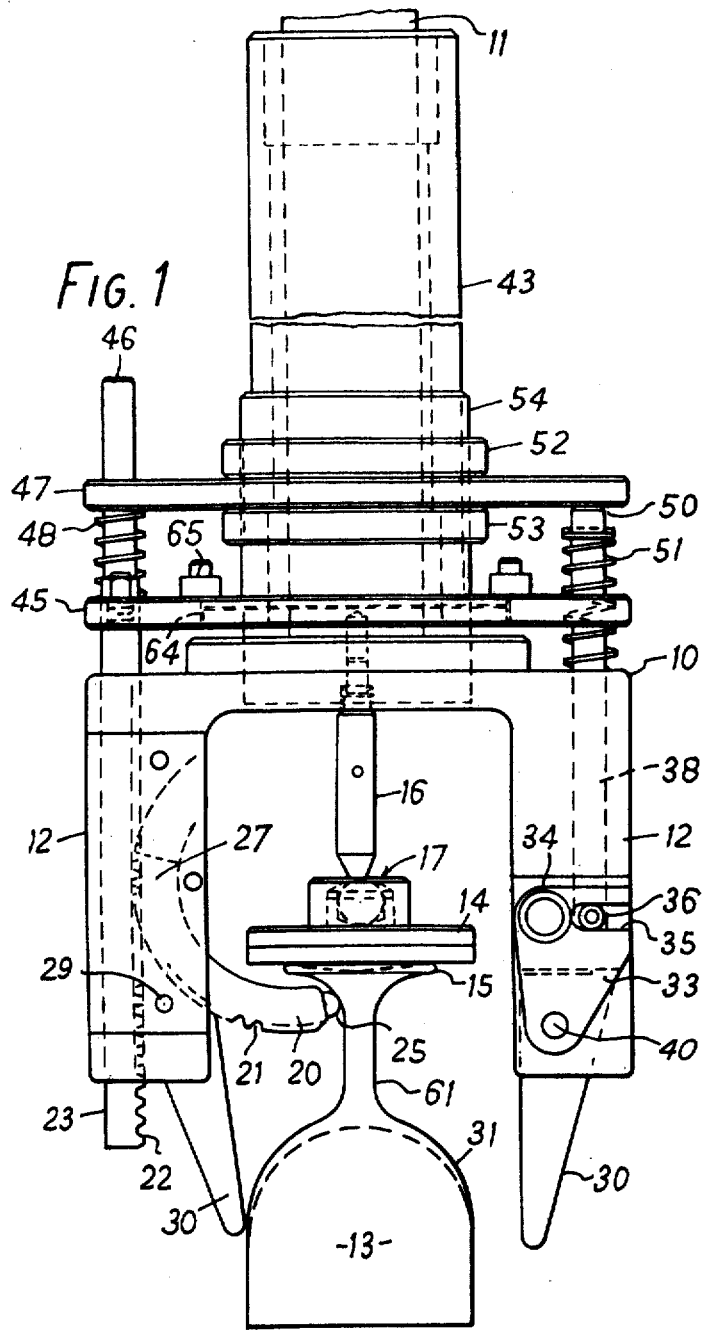
FIG. 1 is a general side view of a chuck holding a stemmed glass.
Figure 2:
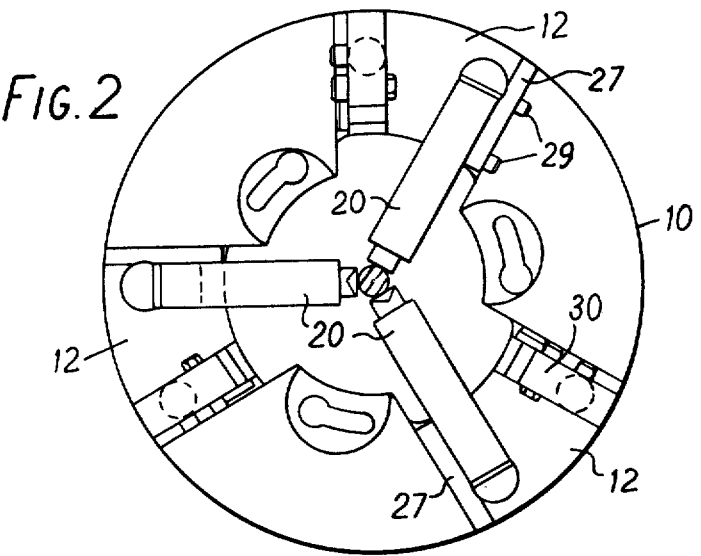
FIG. 2 is an end view of the chuck shown in FIG. 1.

The illustrated chuck has a body 10 affixed to a spindle 11. The spindle is for connection to a drive spindle of a vertical rotary machine, not shown. The vertical rotary machine does not form part of the present invention and for this reason no details thereof will be given here. The chuck is suspended with its spindle vertical for rotation about the central axis of the spindle.

The body 10 is of circular outline and has three legs 12 projecting forwardly from its periphery. Each leg is 120° from its neighbours. A space is formed between the legs 12 to receive part of a glass 13. A foot 14 is positioned centrally within this space to provide a rest or bearing surface for the base 15 of the glass. The foot 14 is carried upon a shaft 16 which is detachably received in a central bore in the end of the spindle 11. The foot 14 is coupled to the shaft 16 through a ball and socket joint 17 which affords universal movement of the foot 14 about the shaft 16.

The chuck has three locking jaws 20 for holding the glass 13 firmly against the foot 14. The jaws 20 are each supported within a different one of the legs 12. Each jaw 20 is arcuate in shape and has a set of teeth 21 on its outer periphery. The teeth 21 mesh with teeth 22 of a rack 23 which is reciprocally mounted within a passage extending through the associated leg 12. When the racks 23 are moved forwardly, i.e. downwardly as seen in the drawings, the tips 25 of the jaws 20 are caused to swing inwardly and towards the centre of the foot 14. Cover plates 27 secured to the legs 12 by bolts 29 prevent detachment of the jaws 20 from the chuck even when the racks 23 are moved to the extreme limits of their travel. Removal of the bolts 29 makes it possible to remove the jaws 20. This may be desired when certain shapes of glass are to be held by the chuck.

Each leg 12 also bears a centering jaw 30. The three jaws 30 engage the glass 13 at points spaced further from the foot 14 than the jaws 20. Their purpose is to centre the bowl 31 of the glass upon the axis of rotation of the spindle 11. Each jaw 30 is secured to a lever 33 which is pivoted to the associated leg by a pivot 34. The lever 33 has a slot 35 accommodating a roller 36 at the end of a push rod 38. The rod 38 is accommodated in a second passage in the associated leg 12. It will be appreciated that when the rods 38 are advanced downwardly, the levers 33 are rotated clockwise as seen in FIG. 1 and the jaws 30 are moved inwardly to engage the bowl 31 of the glass 13. The jaws 30 are detachably secured to their levers 33 by bolts 40.

The tips 25 of the jaws 20 and the jaws 30 are made from a heat-resisting material. An asbestos-based substance marketed by Turner Newall Limited under the name SINDANYO is suitable. This material will not mark the surface of a hot glass.

Positioning the jaws 20, 30 is accomplished by reciprocating the rack 23 and push rod 38 within their passages by control mechanism which includes a sleeve 43 mounted for sliding movement along the spindle 11.

A first control member in the form of a flat plate 45, of annular shape is secured to the upper ends of the racks 23. Spring-locating pins 46 form extensions of the racks 23 and pass through apertures in a second control member in the form of a plate 47 which is held fast with the sleeve 43. Coil compression springs 48 surround the pins 46 and act between the plates 45 and 47. The plate 45 is not attached to the sleeve 43 and can move slightly relative thereto, for a purpose to be explained. Downward movement of the plate 45 causes the jaws 20 to move inwardly into engagement with the glass 13.

Plate 47 can be set in abutment with the ends 50 of the push rods 38, and when moved downwardly moves the jaws 30 into contact with the bowl 31. Compression springs 51, between the chuck body 10 and washers fastened to the push rods 38 adjacent their ends 50, act to bias the jaws 30 to a position in which they are released from the glass. The plate 47 is normally held rigidly to the sleeve 43 by collars 52, 53 which are in screw-threaded connection with external screw threads 54 on the sleeve.

Setting the chuck to hold the glass 13 will now be described. To start with, it is assumed that both sets of jaws 20, 30 are in released positions, not as shown in the drawings. In the released condition, the jaws 20 are withdrawn outwardly, the racks 23 are raised and the sleeve 43 and plates 45, 47 are also raised from their positions shown in FIG. 1. The jaws 30 are also held in released positions by their associated springs 51 acting through the push-rods 38.

A glass 13 is now placed against the foot 14 and the sleeve 43 is advanced downwardly along the spindle 11. For the time being, the plate 47 is set to such a position that its movement with the sleeve 43 has no effect on the jaws 30. Nevertheless, as it moves, the plate 47 pushes the plate 45 downwardly through the springs 48. The downward movement of the plate 45 moves the racks 23 and hence causes the jaws 20 to move inwardly and close upon the glass 13. The sleeve 43 is moved by an actuator (not shown) forming part of the rotary machine to which the chuck is attached. The chuck is so designed that even when the jaws 20 are fully closed, at least ⅛ inches advancing downward movement of the sleeve 43 is allowed. After the jaws 20 have initially closed upon the glass 13, the actuator is caused to drive the sleeve 43 downwardly by at least this distance. The continued movment of the sleeve 43 compresses the springs 48. The jaws 20 are thus firmly pressed against the glass 13 by the springs 48, whilst still allowing the glass some freedom to rock about the axis of rotation of the spindle 11. The actuator of the rotary machine, is of course, designed to hold the sleeve 43 in the advanced position thereof, against the reaction of the springs 48.

Having secured the glass 13 to the chuck by the jaws 20, it is necessary to centralise the bowl 31. Stemmed glasses such as 13 are seldom highly accurate made, and it is uncommon for the bowl 31, the step 61 and base 15 to be square and concentric to one another.

Accordingly, though the jaws 20 may hold the base 15 centrally of the foot 14, the bowl 31 will usually be off centre with respect to the rotation axis. To centre the bowl 31, the jaws 30 are moved inwardly by shifting the plate 47 along the sleeve 43. This is achieved by slackening collar 53 and screwing collar 52 downwardly. Once the jaws 30 have engaged the bowl 31, the collar 53 is tightened up against the plate 47 to lock it in position. As the jaws 30 close onto the bowl 31, they deflect the bowl 31 into a centred position, deflection being permitted by the sprung jaws 30 and universally mounted foot 14.

It will be understood that each of the jaws of the two sets thereof move inwardly simultaneously and at the same rate as the other jaws of the same set.

To remove the glass 13 from the chuck, all that is necessary is to withdraw the sleeve 43 upwardly. As the plate 47 is shifted away from the body 10 of the chuck, springs 51 urge the push rod 38 Upwardly and hence shift the jaws 30 outwardly. At the same time, the compression of the springs 48 is released. The sleeve carries a fixed flange 64. When this flange engages abutments 65 secured to the plate 45, continued movement of the sleeve lifts the plate 45 and thus retracts the jaws 20, releasing the glass 13.

Figure 3:
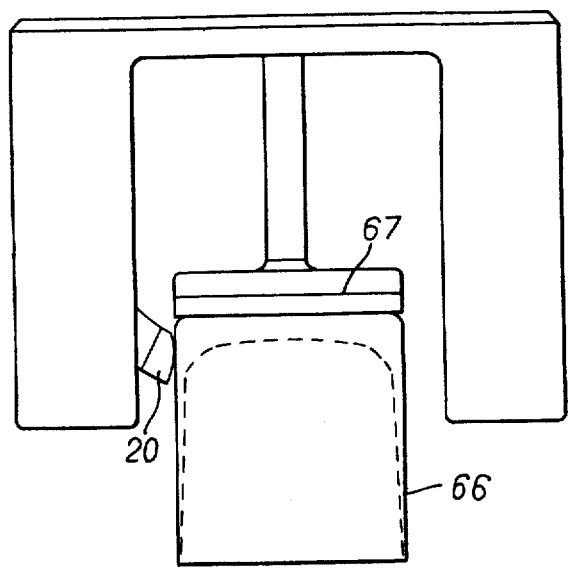
FIGS. 3 to 5 illustrate diagrammatically the chuck when adapted to hold glass articles of a variety of different shapes.
Figure 4:
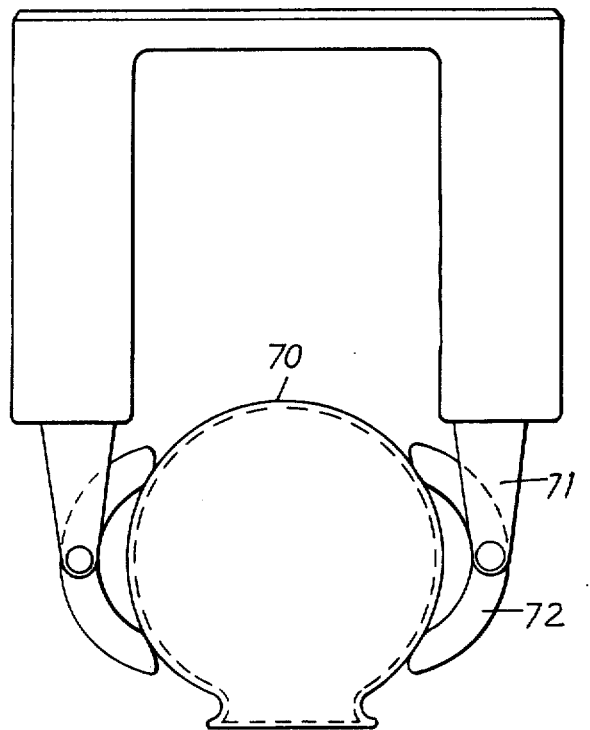
Figure 5:
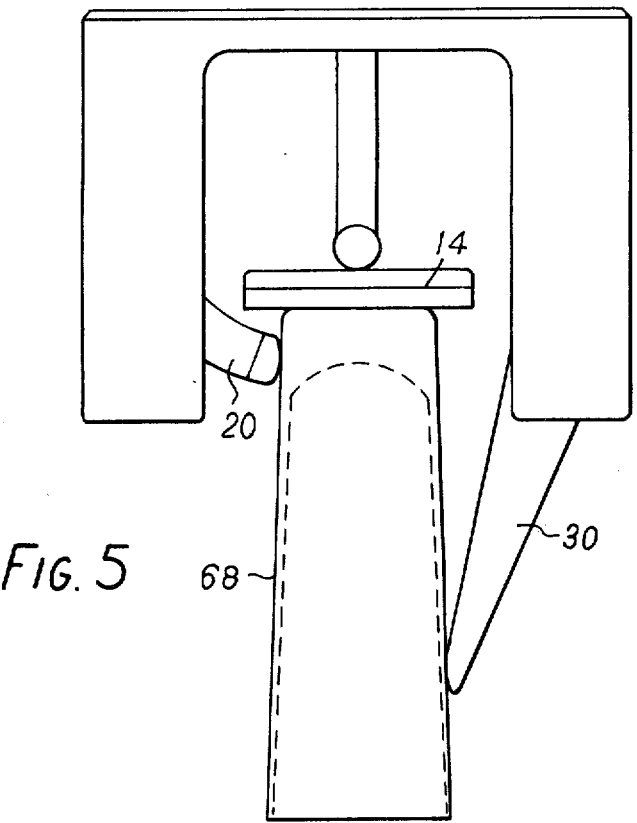

The chuck is readily adaptable to hold glasses or other articles of different shapes. Examples are shown in FIGS. 3 to 5. In FIG. 3, a short squat tumbler 66 is shown, which is held by jaws 20 to a rigid foot 67 which has replaced universally mounted foot 14. Such a tumbler 66 does not present centering difficulties, and hence the centering jaws are not needed. They have here been detached from their associated levers. A tall tumbler 68, see FIG. 5, is more critical to set up accurately. Thus, such a tumbler is held by jaws 20 to the universally-mounted foot 14 and is centered by jaws 30.

The chuck may be adapted to hold spherical articles such as the bowl 70, as shown in FIG. 4. Here, both the foot 14 and the locking jaws 20 are removed, and replacement centering jaws 71 are substituted for the jaws 30. The substitute jaws 71 have pivotally-attached arcuate members 72 forming forks between which the article 70 is held.

Whereas the chuck described has different mechanism coupled to the two sets of jaws for moving them in and out, i.e. driving racks and push-rods, it will be appreciated that identical drive coupling mechanism could be used for both sets of jaws. Other forms of coupling are possible, for example, a guide groove or cam formed on each push-rod to displace a cam follower attached to the associated jaw.

I claim:

1. A chuck comprising a body, a foot attached to the body, a first set of movable jaws for holding a workpiece against the foot, each of the jaws of the first set being of arcuate shape and carrying a series of gear teeth in its outer edge, a second set of movable jaws for centering the workpiece upon the chuck, said second of jaws being further from the foot than the first set of jaws, means coupled to said first and second sets of jaws for moving the jaws inwardly and outwardly, said means comprising a plurality of racks each engaging with the teeth of one of the jaws of the first set, and resilient biassing means urging the jaws of the first set resiliently towards the foot, whereby while the workpiece is resiliently held by said first set of jaws the workpiece is shifted into a centred position by said second set of jaws.

2. A chuck as claimed in claim 1, in which each of the jaws of the second set is pivotally mounted and the means for moving the jaws comprises a plurality of push rods each coupled to one of the second set of jaws to swing the jaw about its pivot.

3. A chuck as claimed in claim 2, in which the coupling between each push rod and its jaw comprises a roller mounted on the push rod and engaging in a slot in the jaw which is transverse to the direction of movement of the rod.

4. A chuck as claimed in claim 1 in which the said moving means comprise a first control member common to the jaws of the first set and a second control member common to the jaws of the second set and the said resilient biassing means act between the first and second control members, means being provided for positively positioning the second control member.

5. A chuck as claimed in claim 1 comprising a universal joint coupling the foot to the body of the chuck.

6. A chuck comprising a body, a foot attached to the body, a first set of movable jaws for holding a workpiece against the foot, a second set of movable jaws for centering the workpiece upon the chuck, said second set of jaws being further from the foot than the first set of jaws, each of the jaws of said second set being pivotally mounted, means coupled to said first and second sets of jaws for moving the jaws inwardly and outwardly, said means comprising a plurality of push rods each having a roller mounted thereon, each of the jaws having a transverse slot in which the roller of one of the said push rods is engaged to swing said jaw about its pivot, and resilient biassing means urging the jaws of the first set resiliently towards the foot, whereby while the workpiece is resiliently held by said first set of jaws the workpiece is shifted into a centred position by said second set of jaws.

7. A chuck comprising a body, a foot attached to the body, a first set of movable jaws for holding a workpiece against the foot, a second set of movable jaws for centering the workpiece upon the chuck, said second set of jaws being further from the foot than the first set of jaws, means coupled to said first and second sets of jaws for moving the jaws inwardly and outwardly, and resilient biassing means urging the jaws of the first set resiliently towards the foot, whereby while the workpiece is resiliently held by said first set of jaws the workpiece is shifted into a centred position by said second set of jaws, wherein said moving means comprise a first control member common to the jaws of the first set and a second set and a second control member common to the jaws of the second set and the said resilient biassing means act between the first and second control members, means being provided for positively positioning the second control member.

8. A chuck as claimed in claim 7 comprising a universal joint coupling the foot to the body of the chuck.

9. A chuck as claimed in claim 7 in which the said moving means comprise a first control member common to the jaws of the first set and a second control member common to the jaws of the second set and the said resilient biassing means act between the first and second control members, means being provided for positively positioning the second control member.

10. A chuck as claimed in claim 7 in which each of the jaws of the first set is of arcuate shape and carries a series of gear teeth on its outer edge and the means for moving the jaws comprises a plurality of racks each engaging with the teeth of one of the jaws of the first set.

* * * * *